(12) United States Patent
Asano et al.

(10) Patent No.: US 6,535,346 B1
(45) Date of Patent: Mar. 18, 2003

(54) DUAL HEAD DISK DRIVE UNIT FOR DIFFERING RECORDING DENSITIES

(75) Inventors: Isao Asano, Fukushima (JP); Hiroki Hirashima, Fukushima (JP); Masahiro Matsunaga, Kanagawa (JP); Kazuhisa Taira, Tokyo (JP)

(73) Assignees: Sony Corporation, Tokyo (JP); Alps Electric Co., Ltd., Tokyo (JP)

(*) Notice: Subject to any disclaimer, the term of this patent is extended or adjusted under 35 U.S.C. 154(b) by 0 days.

(21) Appl. No.: 09/416,932

(22) Filed: Oct. 13, 1999

(30) Foreign Application Priority Data

Oct. 14, 1998 (JP) .............................. 10-292335

(51) Int. Cl.[7] .......................... G11B 19/02; G11B 19/04
(52) U.S. Cl. ........................................... 360/69; 360/60
(58) Field of Search ........................... 360/75, 69, 31, 360/60, 61, 63

(56) References Cited

U.S. PATENT DOCUMENTS

| 4,933,795 | A | | 6/1990 | Nigam | ....................... 360/121 |
|---|---|---|---|---|---|
| 5,126,895 | A | | 6/1992 | Yasuda et al. | ............ 360/77.07 |
| 5,923,487 | A | * | 7/1999 | Carlson et al. | ............ 360/75 X |
| 5,963,392 | A | * | 10/1999 | Sri-Jayantha et al. | ......... 360/75 |
| 6,005,743 | A | * | 12/1999 | Price et al. | ................ 360/75 X |
| 6,226,140 | B1 | * | 5/2001 | Serrano et al. | ............ 360/75 X |

FOREIGN PATENT DOCUMENTS

GB    2 279 800    1/1995

OTHER PUBLICATIONS

Patent Abstracts of Japan vol. 013, No. 550, Dec. 8, 1989, JP 01 229454.
Patent Abstracs of Japan vol. 1998, No. 11, Sep. 30, 1998, JP 10 149611.

* cited by examiner

*Primary Examiner*—Andrew L. Sniezek
(74) *Attorney, Agent, or Firm*—Frommer Lawrence & Haug LLP; William S. Frommer; Dennis M. Smid (57) ABSTRACT

A disc driving device of the type in which two different head units are moved by a linear motor along the radial direction of two discs having different recording densities. If a floppy disc with the standard recording density (lower order mode) is loaded on a disc table and a shock sensor detects the shock, a controller discontinues the recording and/or reproducing processing by a FDD (Floppy Disk Drive).

7 Claims, 4 Drawing Sheets

DUAL HEAD DISK DRIVE UNIT FOR DIFFERING RECORDING DENSITIES

BACKGROUND OF THE INVENTION

1. Field of the Invention

This invention relates to a disc driving device for recording and/or reproducing information signals for a magnetic disc, a disc drive controlling device for controlling the disc driving device from outside, and to a disc drive controlling system comprised of the disc driving device and the disc drive controlling system.

2. Description of the Related Art

Heretofore, in a floppy disc device adapted for recording and/or reproducing information signals for a flexible floppy disc, a carriage having a head connected thereto is moved by a stepping motor along the radius of the magnetic disc.

The basic operations for recording and/or reproduction, such as head movement, is controlled from the host side via an interface I/F. If a trouble occurs in the recording and/or reproduction, it cannot be detected by the drive device itself, while there lacks means to apprise the host side of that effect. The head position is adapted to be maintained mechanically against shocks from outside.

Meanwhile, in a disc driving device of the type in which a magnetic head unit is moved along the disc of the floppy disc by, for example, a voice coil motor, instead of by a stepping motor, via a carriage, there is a risk of destruction of data of a recorded neighboring track if a shock is applied during recording from outside.

On the other hand, if the shock ceases, the recording and/or reproduction needs to be re-tried. However, the driving device is not provided with an interface designed for the driving device to execute the re-try operation.

SUMMARY OF THE INVENTION

It is therefore an object of the present invention to provide a disc driving device of the type in which two different head units are moved by a linear motor in the radial direction of two discs having different recording densities for recording and/or reproducing information signals, wherein it is possible to interrupt the recording and/or reproducing processing on detection of a shock from outside.

It is another object of the present invention to provide a disc driving device wherein the disc driving device can be caused to execute the re-try on shock cessation.

In one aspect, the present invention provides a disc driving device including first head means moved by a linear motor in a direction along the radius of a first disc for recording information signals thereon at a first recording density or reproducing information signals recorded thereon at the first recording density, first interfacing means for receiving from outside signals to be recorded by the first head means and for sending to outside signals reproduced by the first head means, second head means moved by a linear motor in a direction along the radius of a second disc for recording information signals thereon at a recording density higher than the first recording density or reproducing information signals recorded thereon at the recording density higher than the first recording density, second interfacing means for receiving from outside signals to be recorded by the second head means and for sending to outside signals reproduced by the second head means, shock detection means for detecting the shock from outside, and control means for controlling the recording and/or reproducing processing for the first and second discs on shock detection by the shock detection means.

When the first disc is loaded in position, and the shock detection means detects the shock, the control means interrupts the recording and/or reproducing processing for the first disc based on a control signal received from outside via the second interfacing means.

In the present disc driving device, there is also provided first recording and/or reproducing processing means for performing signal recording processing on signals for recording received from outside via the first interfacing means, and for performing signal reproducing processing on signal reproduced by the first head means. When the first disc is loaded in position, and the shock detection means detects the shock, the control means interrupts the recording and/or reproducing processing for the first disc based on a control signal received from outside via the second interfacing means.

In the present disc driving device, there is also provided means for holding a flag when the shock detection means detects a shock. When a control signal for clearing the flag held by the holding means is sent from outside via the second interfacing means to the control means, and a recording and/or reproducing command is also sent to the control means, the control means starts the recording and/or reproducing processing by the first recording and/or reproducing signal processing means.

Preferably, the first interfacing means is a floppy disc interface (FDD I/F) and the second interfacing means is an ATAPI I/F.

In the present disc driving device, the first head means and the second head means are supported by a common head carriage.

In another aspect, the present invention provides a disc driving control device for controlling a disc driving device including first head means and second head means moved by a linear motor in a direction along the radius of a first disc configured for recording information signals at a first recording density and a second disc configured for recording information signals at a recording density higher than the first recording density, for recording and/or reproducing information signals thereon, and first interfacing means and second interfacing means for sending signals for recording to the first head means and second head means and for receiving signals reproduced by the first head means and second head means.

The disc driving control device further includes control means for issuing a clear command for clearing a shock flag held on detecting the shock to the first disc by the disc driving device during recording and/or reproducing processing for the first disc, and a command for detecting the possible shock occurrence on reception of the end information indicating the end of every pre-set unit of the re/signal from the disc driving device via the first interfacing means. The control means causes a re-try to be executed via the first interfacing means on detection of the shock occurrence by the command for detecting the possible shock occurrence.

In still another aspect, the present invention provides a disc driving control system including a disc driving device and a disc driving control device. The disc driving device has first and second head means moved by a linear motor in a direction along the radius of a first disc configured for recording information signals at a first recording density and a second disc configured for recording information signals at a recording density higher than the first recording density, for recording and/or reproducing information signals thereon, first and second interfacing means for sending signals for recording to the first head means and second head means and for receiving signals reproduced by the first head means and second head means, and shock detection means for detecting a shock from outside. The disc driving device controls the recording and/or reproducing processing for the first and second discs on detection of a shock from outside. The disc driving control device issues a clear command for clearing a shock flag held on detecting the shock to the first disc by the disc driving device during recording and/or reproducing processing for the first disc, and a command for detecting the possible shock occurrence on reception of the end information indicating the end of every pre-set unit of the recording and/or reproducing signal from the disc driving device via the second interfacing means. The control means causes the disc driving device to execute a re-try via the first interfacing means on detection of the shock occurrence by the command for detecting the possible shock occurrence.

In yet another aspect, the present invention provides a disc drive control system including a disc driving device having first and second head means moved by a linear motor in a direction along the radius of a first disc configured for recording information signals at a first recording density and a second disc configured for recording information signals at a recording density higher than the first recording density, for recording and/or reproducing information signals thereon, interfacing means for sending signals for recording to the first head means and second head means and for receiving signals reproduced by the first head means and second head means, and shock detection means for detecting a shock from outside. The disc driving device controls the recording and/or reproducing processing for the first and second discs on detection of a shock from outside. The disc drive control system also includes a host computer for sending signals for recording to the first and second head means via the interfacing means and for receiving signals reproduced by the first and second head means. There is also provided disc drive control means for controlling the recording and/or reproducing operation for the first or second disc, based on information signals of the host computer, on shock detection by the shock detection means of the disc driving device during the recording and/or reproducing processing for the first or second disc.

According to the present invention, even in a disc driving device of the type in which two head portions differing from each other are moved by a linear motor in a direction radially of two discs of different recording densities, it is possible to detect the shock from outside to discontinue recording and/or reproduction. Thus, there is no risk of destruction of the recorded data in the neighboring track.

Also, in the present disc driving controlling device and system according to the present invention, it is possible to cause the disc driving device to execute a re-try on shock cessation.

DESCRIPTION OF THE PREFERRED EMBODIMENTS

Referring to the drawings, preferred embodiments of the present invention will be explained in detail. The present embodiment is directed to the floppy disc control system shown in FIG. 1. This floppy disc control system is made up of a floppy disc driving device 1 and a host computer 140.

Figure 2A:
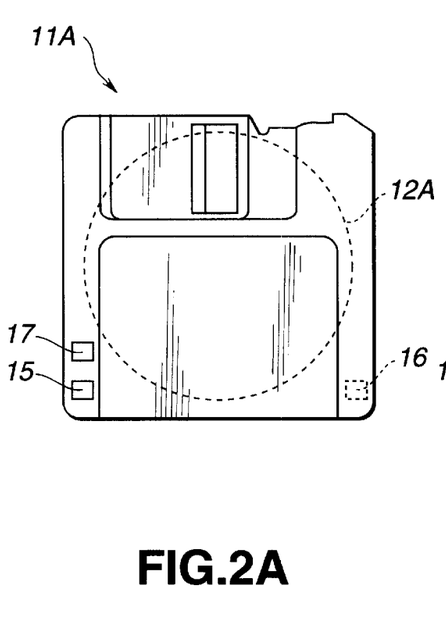
FIGS. 2A and 2B show a floppy disc of a standard recording density and a floppy disc of a high recording density that can be used on a floppy disc driving device constituting the floppy disc driving control system shown in FIG. 1.
Figure 2B:
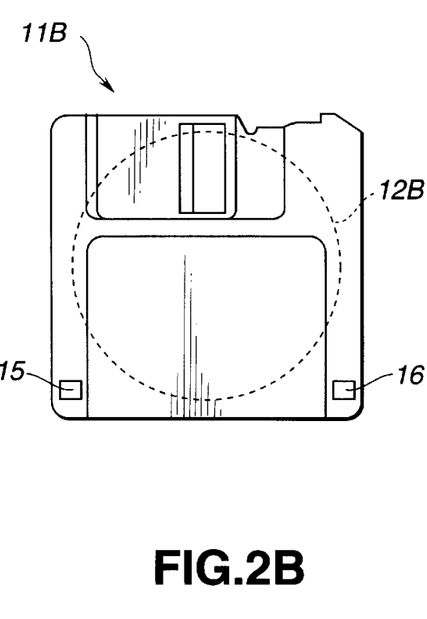

As the floppy disc 11, usable in this floppy disc driving device 1, floppy discs 11A, 11B, shown in FIGS. 2A and 2B, are presupposed. Specifically FIG. 2A shows a floppy disc 11A having housed therein a disc medium 12A of a high recording density(upper order mode) having a large recording density of the order of tens to hundreds of megabyte or more and which is compatible with pre-existing floppy disc. FIG. 2B shows a floppy disc 11B having housed therein a pre-existing disc medium 12B having a standard recording density (lower order mode) having a recording density of, for example, 2 megabyte.

In FIGS. 2A and 2B, a write protector 15 indicates a writing possible state and a writing inhibiting state if its hole is closed or opened, respectively. An HD hole 16 indicates a so-called 2HD disc having a recording capacity of approximately 2 megabyte in an unformatted state, and other discs, if the hole is opened or closed, respectively. In FIG. 2A, a hole 17, provided at a pre-set location, other than those for the write protector 15 or the HD hole 16, indicates a large capacity floppy disc having the recording capacity of the order of tens to hundreds of megabyte, as mentioned above.

Figure 1:
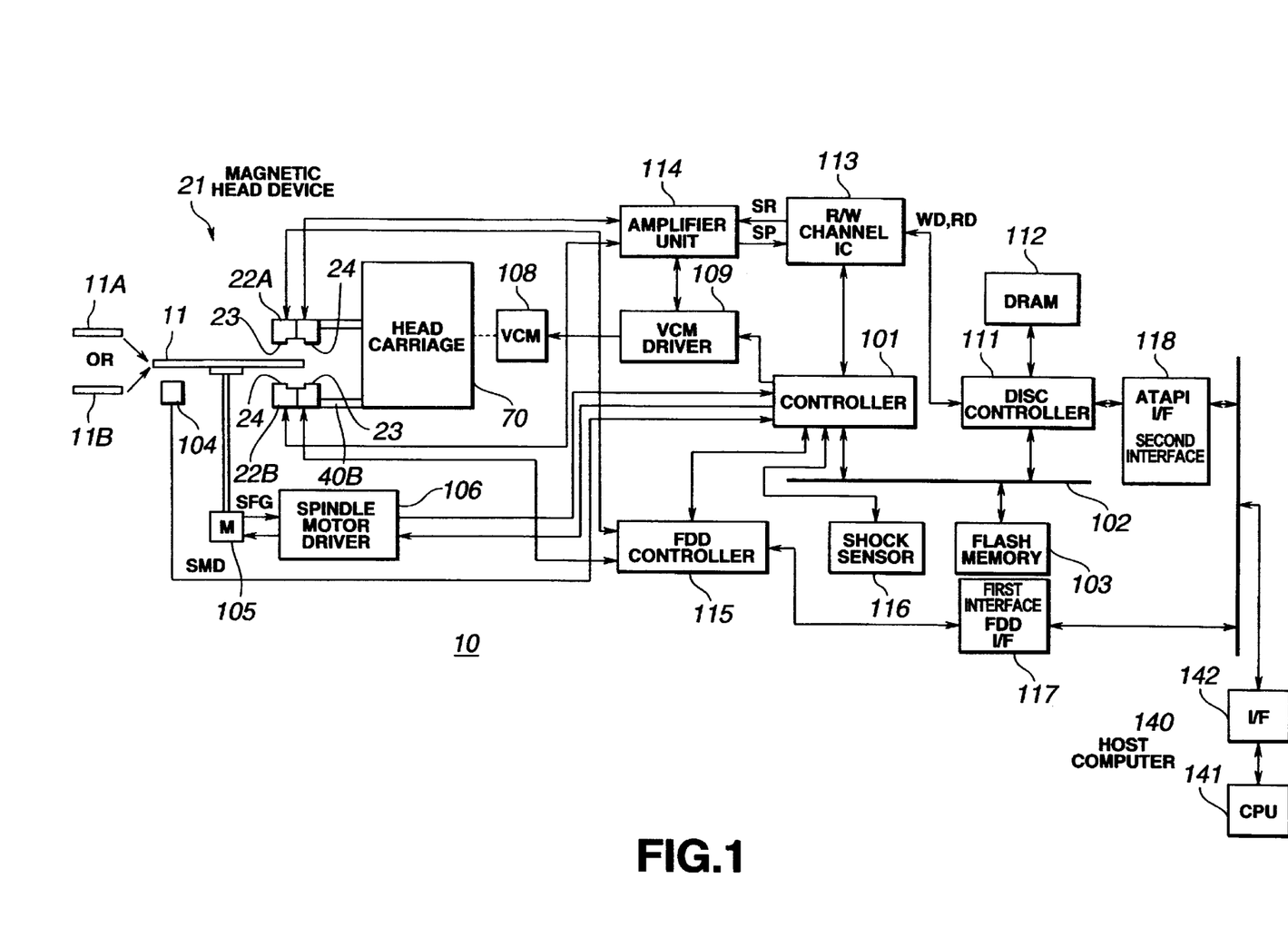
FIG. 1 is a block diagram showing the structure of a floppy disc drive control system embodying the present invention.

In the present floppy disc driving device 10, the driving of a magnetic head device 21 for the floppy disc 11B of the standard recording density and the floppy disc 11A of high recording density is performed by a voice coil motor (VCM) 108, which is a sort of a linear motor. In the floppy disc 11A of high recording density, the servo information is recorded from the outset, such that, by reading this servo information, the VCM 108 is driven to actuate the magnetic head device 21.

Meanwhile, in recording and/or reproducing the standard recording density floppy disc 11B, this floppy disc 11B operates for causing movement of the floppy disc 11B by the VCM 108, rather than by the stepping motor, via a head carriage 70. Thus, if an excessive shock is applied from outside to the focussing drive 10, the recording and/or reproduction needs to be interrupted, if the floppy disc 11B is being recorded, because there is the risk of destruction of data of the recorded neighboring track. However, if the shock ceases to be applied, the host sides has to re-try the recording and/or reproduction.

Thus, in the present focussing drive 10, the shock applied from outside is detected by a shock sensor 116. Based on the result of detection, the recording and/or reproduction is discontinued. On cessation of the shock application, the recording and/or reproduction is re-tried under control from the host side, as will be explained subsequently in detail.

The structure and the operation of the floppy disc drive device 10 are hereinafter explained in detail.

The magnetic head device 21, configured for executing magnetic recording and/or reproduction for a floppy disc 11, includes head units 22A, 22B, arranged on both sides of and facing the floppy disc 11. The head unit 22A is designed for recording and/or reproducing an upper recording surface of the floppy disc 11, while the head unit 22B is designed for recording and/or reproducing the lower recording surface of the floppy disc 11. In the head units 22A and 22B are assembled a head chip 23 of the standard recording density (lower order mode) for the pre-existing floppy disc 11B and a head chip 24 of a high recording density (upper order mode) for the high recording density floppy disc 11A.

Figure 3:
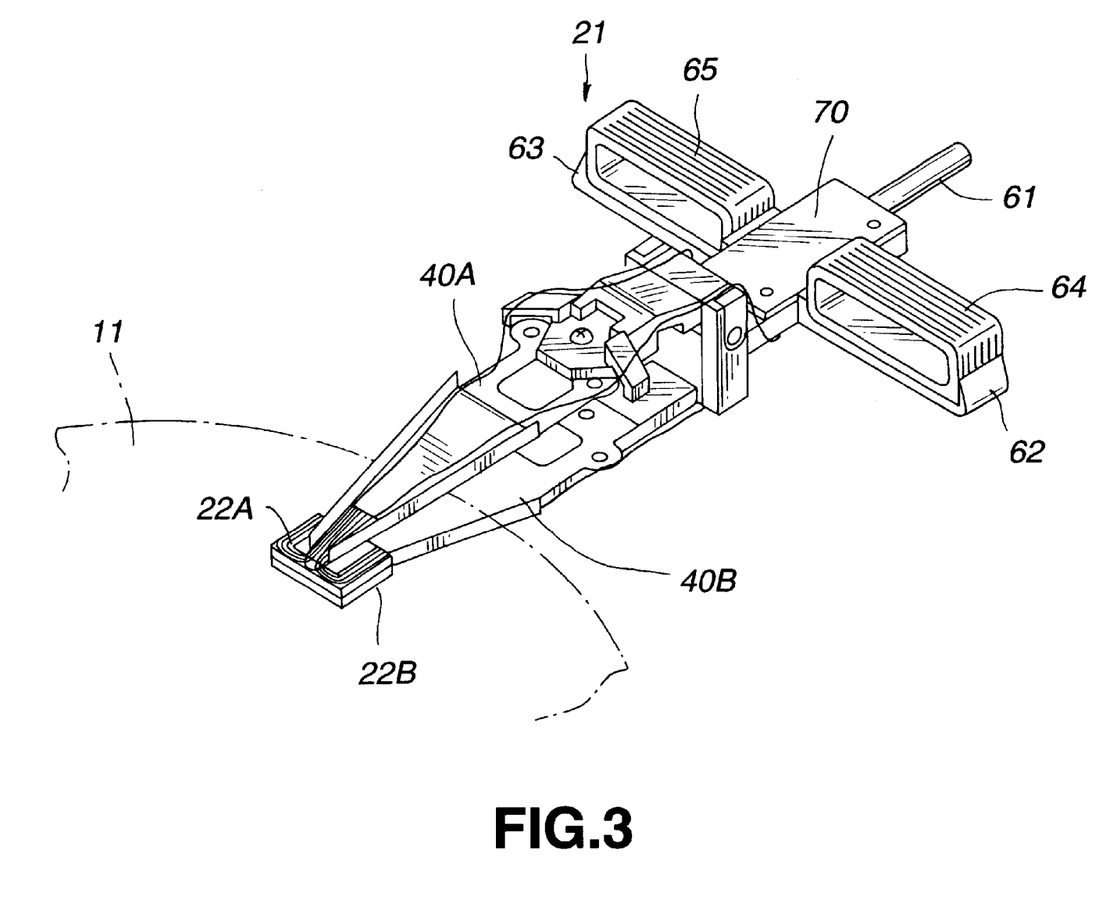
FIG. 3 is a perspective view showing the appearance of a magnetic head device provided on a floppy disc driving device constituting the floppy disc drive control system shown in FIG. 1.

In the magnetic head device 21, the head units 22A, 22b are supported by supporting arms 40A, 40B, respectively. The supporting arms 40A, 40B are connected to the head carriage 70 moved radially of the floppy disc 11. The magnetic head device 21 is shown in perspective in FIG. 3. Both proximal side ends of the head carriage 70 are formed with a pair of protuberant coil supporting pieces 62, 63 on which are mounted driving coils 64, 65 introduced into yokes, not shown, of a voice coil motor (VCM) 108 shown in FIG. 1. The head carriage 70 is fed with the driving current from the VCM 108 and is thereby moved in a direction along the radius of the floppy disc 11.

Reverting to FIG. 1, the floppy disc drive device 10 has a controller 101 for controlling the entire device. The controller 101 performs control of the recording and/or reproducing system, such as rotational control of the floppy disc 11, movement control of the magnetic head 21, control of the recording and/or reproducing system for high recording density (upper order mode) and control of the recording and/or reproducing system for standard recording density (lower order mode).

The controller 101 is connected to a bus 102. The controller 101 fetches the program stored in a flash memory 103 connected to a bus 102 and executes the control operation in accordance with the fetched program.

The floppy disc drive device 10 also includes a disc detection unit 104 for detecting, by exploiting the above-mentioned hole 17, whether the floppy disc 11 is a floppy disc 11A for high recording density (upper order mode) or a floppy disc 11B of the standard rotationally driving (lower order mode). An output signal of the disc detection unit 104 is routed as a mode signal SMD to the controller 101. The controller 101 is responsive to the mode signal SMD to perform switching control of the rotational speed of the floppy disc 11, switching control of the recording and/or reproducing system and the interface switching control.

The floppy disc drive device 10 also includes a spindle motor 105 for rotationally driving the floppy disc 11, and a spindle motor driver 106 for driving the motor 105. A frequency signal SFG, obtained from the spindle motor 106, and which indicates its rotational speed, is routed via the motor driver 106 to the controller 101. The controller 101 refers to the frequency signal SFG to control the spindle motor driver 106 so that the rotational speed of the floppy disc 11 will be a pre-set value.

The floppy disc drive device 10 includes a VCM driver 108, designed to move the head carriage 70, to which are connected supporting arms 40A, 40B supporting the head units 22A, 22b making up the magnetic head device 21, along the radius of the floppy disc, and a VCM driver 109 for driving the VCM driver 108. The controller 101 controls the VCM driver 109 so that, when the high recording density floppy disc 11A is loaded in position, the magnetic head device 21 will be positioned correctly at a target track, based on the tracking information of the magnetic head device 21 outputted by a R/W channel IC 113, as later explained, or the Gray code readout information.

The floppy disc drive device 10 includes a recording and/or reproducing system for high recording density mode (upper order mode) and a recording and/or reproducing system for standard recording density mode (lower order mode). The recording and/or reproducing system for high recording density mode (upper order mode) includes a disc controller 111 for exchanging data, statuses and commands with the host computer, via an advanced technology attachment packet interface (ATAPI) 118, a DRAM 112 as a data buffer, a R/W channel IC 113 for recording signal processing and playback signal processing, and an amplifier unit 114. The amplifier unit 114 is made up of a recording amplifier for amplifying recording signals outputted by the R/W channel IC 113 for supplying the amplified recording signals to the head chips 24 for high recording density (upper order mode) of the head units 22A, 22B and a playback amplifier 114 for amplifying playback signals reproduced by the head chip 24 to send the amplified playback signals to the R/W channel IC 113.

The disc controller 111 is connected to the bus 102. The operations of the disc controller 111 and the R/W channel IC 113 are respectively controlled by the controller 101.

The present floppy disc drive device 10 also includes a FDD controller 115 as a recording and/or reproducing system for standard recording density (lower order mode). The FDD controller 115 has the functions of generating recording signals from MFM modulated data sent from the host computer 140 during writing to send the generated recording signals to the head chip 23 and of acquiring MFM modulated data from the playback signals from the head chip 23 during readout to send the data to the host computer 140.

That is, the present floppy disc drive device 10 includes the head chip 23 for recording and/or reproducing information signals by being moved by the VCM 108 in a direction along the radius of the floppy disc 11B for standard recording density (lower order mode) for recording and/or reproducing information signals, and an FDDI/F unit 117 for receiving the information signals for recording by the head chip 23 from the external host computer 140 and for routing the information signals reproduced by the head chip 23 to the external host computer 140. The floppy disc drive device 10 also includes the head chip 24 moved by the VCM 108 in the direction along the radial direction of the floppy disc 11A for high density recording (upper order mode) for recording and/or reproducing information signals and an ATAPI-I/F unit 118 for receiving information signals for recording by the head chip 24 from the external host computer 140 and for routing information signals reproduced by the head chip 24 to the external host computer 140. The floppy disc drive device 10 also includes the controller 101 for controlling the recording and/or reproducing processing for the floppy disc 11B for standard recording density (lower order mode) and for the floppy disc 11A for high recording density (upper order mode) on shock detection by the shock sensor 116.

The present floppy disc drive device 10 also includes the FDD controller 115 for preforming signal recording processing on the information signals for recording received via the FDDI/F unit 117 from the host computer 140 and for performing playback signal processing on information signals reproduced by the head chip 23.

In particular, when the floppy disc 11B for standard recording density (lower order mode) is loaded on the disc table and the shock sensor 116 detects the shock, the controller 101 interrupts the recording and/or reproducing signal processing of the FDD controller 115, based on the control signal received from the host computer 140 via the ATAPI-I/F unit 118.

Also, the present floppy disc drive device 10 includes a holder for holding a shock flag when the shock sensor 116 detects the shock. The recording and/or reproducing processing of the FDD controller 115 is started when a control signal which clears the shock flag held by the holder is sent to the host computer 140 via the ATAPI-I/F unit 118 and the recording and/or reproducing command is furnished.

The host computer 140 includes a central processing unit (CPU) 141 which issues a clear command for clearing the shock flag held generated and held by the floppy disc drive device 10 on shock detection during recording and/or reproducing processing for the floppy disc 111B for standard recording density (lower order mode) and a command for detecting the possible shock occurrence or reception of the end information every pre-set unit of the recording and/or reproducing signal from the disc driving device 10 to the FDDI/F unit 117 and for executing a re-try via the FDDI/F unit 117 on detection f the shock occurrence by the command for detecting the possible shock occurrence.

The host computer 140 also includes an I/F 142 having the function for two I/Fs 117, 118 of the floppy disc drive device 10.

The overall operation of the floppy disc drive device 10 is hereinafter explained. When the floppy disc 11B for standard recording density (lower order mode) is loaded as the floppy disc 11, the mode signal SMD supplied to the controller 101 from the disc detection unit 104 indicates the lower order mode. Thus, the spindle motor driver 106 is controlled by the controller 101, based on the frequency signal SFG from the spindle motor 105, whilst the floppy disc 11B is caused to be rotated at a standard velocity, such as at 300 rpm. The recording and/or reproducing system for standard recording density (for lower order mode) can now be used under control by the controller 101.

In this state, MFM modulated data is routed as writing data from the host computer 140 via the FDDI/F unit 117 to the FDD controller 115, during writing. The FDD controller 115 outputs recording signals corresponding to the MFM modulated data to the head chips 23 of the head units 22A, 22B. The output recording signals are recorded on a pre-set sector of the target track of the floppy disc 11. During readout, signals reproduced from the head chip 23 from the pre-set sector of the target track of the floppy disc 11 are routed to the FDD controller 115, from which the MFM modulated data corresponding to the playback signals are outputted via the FDDI/F unit 117 so as to be supplied to the host computer 140.

If the floppy disc 11A for high recording density (upper order mode) is loaded as the floppy disc 11, the mode signal SMD supplied from the disc detection unit 104 to the controller 101 indicates the upper order mode. Thus, the spindle motor driver 106 is controlled by the controller 101, based on the frequency signal SFG from the spindle motor 105, so that the floppy disc 11A is caused to run in rotation at a higher velocity of, for example, 3600 rpm. The recording and/or reproducing system for high recording density (upper order mode) can now be used under control by the controller 101.

In this state, the writing data is sent from the host computer 140 via the ATAPI-I/F unit 118 to the disc controller 111 so as to be transiently stored in the DRAM 112. This writing data is processed by the disc controller 111, such as with error correction coding or interleaving, to generate writing data WD.

For recording in a pre-set sector of the target track of the floppy disc 11, writing data is routed by the disc controller 111 to the R/W channel IC 113 by the disc controller 111. The R/W channel IC 113 outputs recording signals SR, associated with the writing data WD. The output recording signals SR are routed via the recording amplifier of the amplifier unit 114 to the head chips 23 of the head units 22A, 22B so as to be recorded on a pre-set sector of the target track of the floppy disc 11.

During readout, signals reproduced by the head chip 24 from a pre-set sector of a target track of the floppy disc 11 are amplified by a playback amplifier of the amplifier unit 114 and thence supplied to the R/W channel IC 113, where the signals are subjected to waveform equalizing processing, data discriminating processing or 16/17 decoding to generate readout data RD. This readout data RD is sent to the disc controller 111 where it is deinterleaved and corrected for errors to generate ultimate read-out data. This read-out data is transiently stored in the DRAM 112 and thence routed via ATAPI-I/F unit 118 to the host computer 140.

If, during recording and/or reproduction of the standard recording density floppy disc 11B, the floppy disc drive device 10 detects en excessive shock from outside by its shock sensor 116, the floppy disc drive device 10 interrupts the recording and/or reproduction based on the results of detection. After the excessive shock is removed, the host computer 140 executes the re-try.

Figure 4:
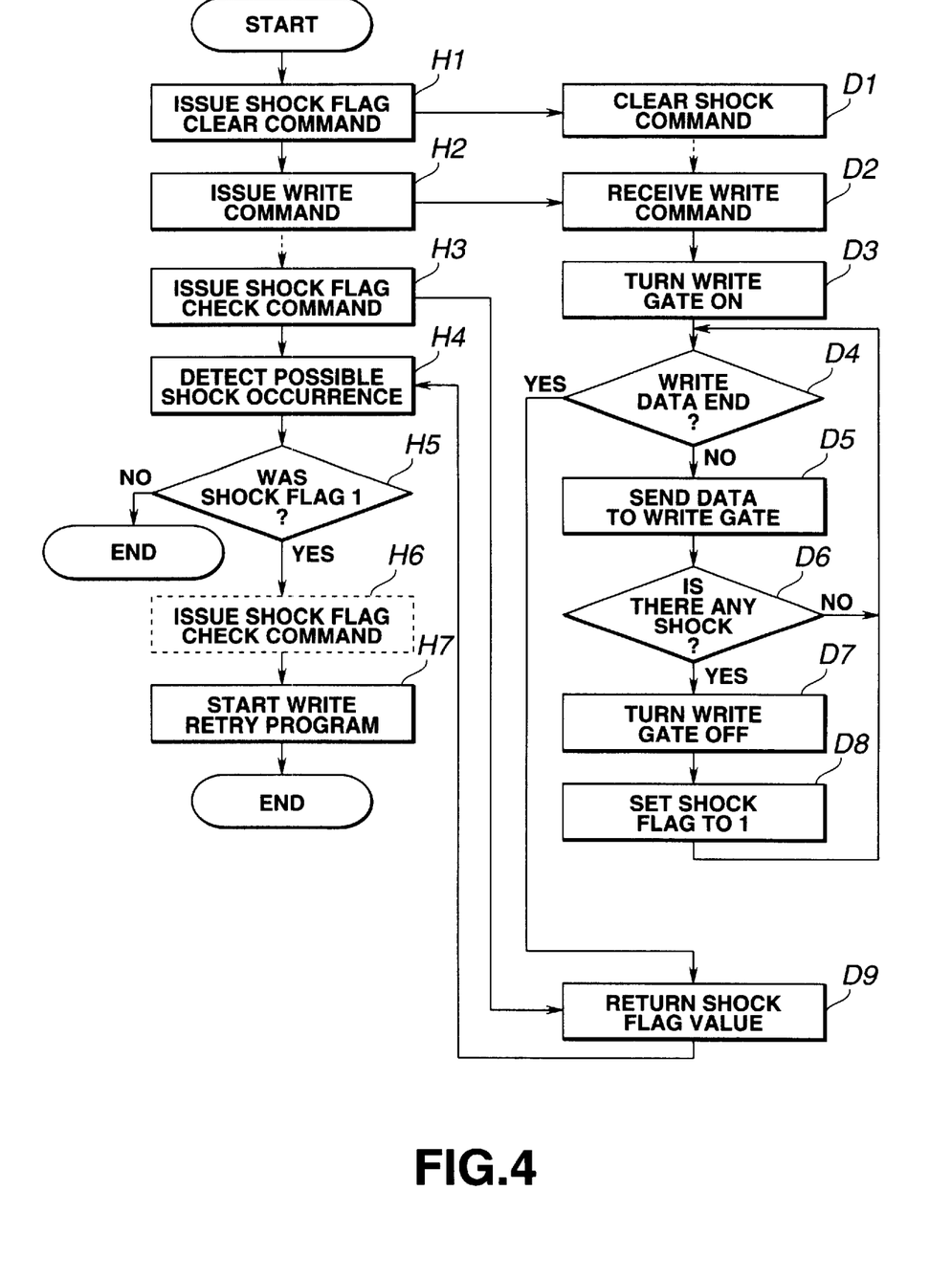
FIG. 4 is a flowchart for illustrating the operation of the floppy disc driving control system shown in FIG. 1.

Thus, if the standard recording density floppy disc 11B is loaded in position and information signals are to be recorded from the side of the host computer 140, the floppy disc control system, made up of the floppy disc drive device 10 and the host computer 140, designed to control the floppy disc drive device 10, performs the processing in accordance with the sequence shown in the flowchart of FIG. 4. In this flowchart, the processing on the side of the host computer 140 is H1 to H7, whilst that on the side of the floppy disc drive device 10 is D1 to D9.

First, the host computer 140 at H1 issues a clear command for the shock flag by an ATAPI vendor unique command, via the ATAPI-I/F unit 118. The controller 101 of the floppy disc drive device 10 at DI clears the shock flag 1.

If the host computer 140 at H2 issues a write command, and the floppy disc drive device 10 at D2 receives the write command, the controller 101 at D3 turns on the write gate of the FDD controller 115. Specifically, the controller 101 causes the FDD controller 115 to generate recording signals corresponding to the MFM modulated data as the sector-based write data sent from the host computer 140 via the FDDI/F unit 117 to the FDD controller 115. The generated recording signals are routed to the head chips 23 of the head units 22A, 22B.

The controller 101 of the floppy disc drive device 10 at D4 verifies the end of the sector-based write data. If the write data end is not reached as yet, the controller 101 at D5 sends data to the write gate of the FDD controller 115. If the end state is verified at D5, the controller 101 proceeds to D9.

During writing, the controller 101 at D6 checks the current state of the shock sensor 116 to verify whether or not the shock sensor 116 has detected an excessive shock to the floppy disc drive device 10. If such shock has been detected, the controller 101 proceeds to D7 to turn off the write gate. The controller 101 then sets the shock flag to 1. If the shock sensor 116 has not detected an excess shock, the processing reverts to step S4.

At D9, the controller returns the value of the shock flag via ATAPI-I/F unit 118. The processing at D9 is executed after issuance at H3 of the shock flag check command from the host computer 140 via the ATAPI-I/F unit 118 by the ATAPI vendor unique command.

The host computer 140 checks this shock flag to detect at H4 the possible shock occurrence to the floppy disc drive device 10. If it is found at H5 that the shock flag is 1, that is if the shock has been detected, the host computer 140 at H6 issues a clear command for clearing the shock flag to send the clear command via the ATAPI-I/F unit 118 to the controller 101. Meanwhile, the issuance of the clear command at H6 may be omitted, if so desired.

At H7, the write re-try program is started to cause the floppy disc drive device 10 to re-execute the writing.

Thus, in the floppy disc control system, shown in FIG. 1, if, when the standard recording density floppy disc 11B is loaded on the floppy disc drive device 10 and write data is sent from the host computer 140, an excess shock is detected, the recording can be interrupted transiently. If the shock is removed, it is possible for the host computer 140 to cause the floppy disc drive device 10 to execute the re-try of recording.

If the high recording density floppy disc 11A for upper order mode is loaded on the floppy disc drive device 10, the VCM 108 is driven based on the servo information written at the outset on the floppy disc 11A. Therefore, if an excess shock is produced, the head chips 24 can promptly be caused to follow the desired track for re-try. However, if the high recording density floppy disc I IA for upper order mode is loaded, write data is supplied from the host computer 140 and the shock sensor 116 has detected the excess shock, the write processing can be forcibly interrupted and retried under control from the host computer 140.

What is claimed is:

1. A disc driving device comprising: first head means moved by a linear motor in a direction along the radius of a first disc for recording information signals thereon at a first recording density or reproducing information signals recorded thereon at the first recording density; first interfacing means for receiving from outside signals to be recorded by said first head means and for sending to outside signals reproduced by said first head means; second head means moved by a linear motor in a direction along the radius of a second disc for recording information signals thereon at a recording density higher than said first recording density or reproducing information signals recorded thereon at said recording density higher than said first recording density; second interfacing means for receiving from outside signals to be recorded by said second head means and for sending to outside signals reproduced by said second head means; shock detection means for detecting the shock from outside; and control means for controlling the recording and/or reproducing processing for said first and second discs on shock detection by said shock detection means;

wherein, when said first disc is loaded in a position, and said shock detection means detects the shock, said control means interrupts the recording and/or reproducing processing for said first disc.

2. A disc driving device comprising: first head means moved by a linear motor in a direction along the radius of a first disc for recording information signals thereon at a first recording density or reproducing information signals recorded thereon at the first recording density; first interfacing means for receiving from outside signals to be recorded by said first head means and for sending to outside signals reproduced by said first head means; second head means moved by a linear motor in a direction along the radius of a second disc for recording information signals thereon at a recording density higher than said first recording density or reproducing information signals recorded thereon at said recording density higher than said first recording density; second interfacing means for receiving from outside signals to be recorded by said second head means and for sending to outside signals reproduced by said second head means; shock detection means for detecting the shock from outside; control means for controlling the recording and/or reproducing processing for said first and second discs on shock detection by said shock detection means; and first recording and/or reproducing processing means for performing signal recording processing on signals for recording received from outside via said first interfacing means, and for performing signal reproducing processing on signal reproduced by said first head means; wherein when said first disc is loaded in a position, and said shock detection means detects the shock, said control means interrupts the recording and/or reproducing processing for said first disc.

3. A disc driving device comprising:

first head means moved by a linear motor in a direction along the radius of a first disc for recording information signals thereon at a first recording density or reproducing information signals recorded thereon at the first recording density; first interfacing means for receiving from outside signals to be recorded by said first head means and for sending to outside signals reproduced by said first head means; second head means moved by a linear motor in a direction along the radius of a second disc for recording information signals thereon at a recording density higher than said first recording density or reproducing information signals recorded thereon at said recording density higher than said first recording density; second interfacing means for receiving from outside signals to be recorded by said second head means and for sending to outside signals reproduced by said second head means; shock detection means for detecting the shock from outside; control means for controlling the recording and/or reproducing processing for said first and second discs on shock detection by said shock detection means;

first recording and/or reproducing processing means for performing signal recording processing on signals for recording received from outside via said first interfacing means, and for performing signal reproducing processing on signal reproduced by said first head means; wherein when said first disc is loaded in a position, and said shock detection means detects the shock, said control means interrupts the recording and/or reproducing processing for said first disc; and means for holding a flag when said shock detection means detects a shock; wherein when a control signal for clearing the flag held by said holding means is sent from outside via said second interfacing means to said control means, and a recording and/or reproducing command is also sent to said control means, said control means starts the recording and/or reproducing processing by said first recording and/or reproducing signal processing means.

4. A disc driving control device for controlling a disc driving device comprising:

first head means and second head means, said first head means moved by a linear motor in a direction along a radius of a first disc configured for recording information signals at a first recording density and said second head means moved by a linear motor in a direction along a radius of a second disc configured for recording information signals at a recording density higher than said first recording density, for recording and/or reproducing information signals thereon, and first interfacing means and second interfacing means for respectively sending signals for recording to said first head means and second head means and for respectively receiving signals reproduced by said first head means and second head means;

said disc driving control device further comprising:

control means for issuing a clear command for clearing a shock flag held on detecting a shock to the first disc by the disc driving device during recording and/or reproducing processing for the first disc, and a command for detecting a possible shock occurrence on reception of end information indicating the end of every preset unit of the recording and/or reproducing information signals from the disc driving device via the second interfacing means;

said control means causing a re-try to be executed on detection of the possible shock occurrence by said command for detecting the possible shock occurrence;

wherein said disc driving device includes first recording and/or reproducing signal processing means for performing signal recording processing on signals for recording received from outside via said first interfacing means, and for performing signal reproducing processing on signal reproduced by said first head means, and wherein, when said first disc is loaded on said disc driving device, and a shock detection means detects the shock, disc driving device interrupts recording and/or reproducing processing of said first recording and/or reproducing signal processing means.

5. A disc driving control system comprising:

a disc driving device having first and second head means, said first head means moved by a linear motor in a direction along a radius of a first disc configured for recording information signals at a first recording density and said second head means moved by a linear motor in a direction along a radius of a second disc configured for recording information signals at a recording density higher than said first recording density, for recording and/or reproducing information signals thereon, first and second interfacing means for respectively sending signals for recording to said first head means and second head means and for respectfully receiving signals reproduced by said first head means and second head means, and shock detection means for detecting a shock from outside, said disc driving device controlling recording and/or reproducing processing for said first and second discs on detection of said shock from outside; and a host computer for issuing a clear command for clearing a shock flag held on detecting the shock to the first disc by the disc driving device during recording and/or reproducing processing for the first disc, and a command for detecting a possible shock occurrence on reception of end information indicating the end of every pre-set unit of the recording and/or reproducing information signals from the disc driving device via the second interfacing means;

said control means causing said disc driving device to execute a re-try on detection of the possible shock occurrence by said command for detecting the possible shock occurrence;

wherein said disc driving device includes first recording and/or reproducing signal processing means for performing signal recording processing on signals for recording received from outside via said first interfacing means, and for performing signal reproducing processing on signal reproduced by said first head means, and wherein, when said first disc is loaded on said disc driving device, and said shock detection means detects the shock, said disc driving device interrupts recording and/or reproducing processing of said first recording and/or reproducing signal processing means.

6. A disc driving control system comprising:

a disc driving device having first and second head means, said first head means moved by a linear motor in a direction along a radius of a first disc configured for recording information signals at a first recording density and a second head means moved by a linear motor in a direction along a radius of a second disc configured for recording information signals at a recording density higher than said first recording density, for recording and/or reproducing information signals thereon, interfacing means for sending signals for respectively recording to said first head means and second head means and for respectively receiving signals reproduced by said first head means and second head means, and shock detection means for detecting a shock from outside, said disc driving device controlling recording and/or reproducing processing for said first and second discs on detection of said shock from outside;

a host computer for sending signals for recording to said first and second head means via said interfacing means and for receiving signals reproduced by said first and second head means; and disc drive control means for controlling a recording and/or reproducing operation for said first or second disc, on shock detection by said shock detection means of the disc driving device during the recording and/or reproducing processing for said first or second disc;

wherein said interfacing means includes a first interface for sending signals for recording to said first disc and for sending signals read from said first disc, and a second interface for sending signals for recording to said second disc and for sending signals read from said second disc; and wherein said host computer issuing, via said second interface, a clear command for clearing a shock flag held on detecting the shock by said shock detection means during recording and/or reproducing processing for the first disc, and a command for detecting a possible shock occurrence on reception of information indicating the end of every pre-set unit of the recording and/or reproducing information signals via the second interfacing means, said host computer causing said disc driving device to execute a re-try on detection of the shock occurrence.

7. A disc driving control system comprising:

a disc driving device having first and second head means, said first head means moved by a linear motor in a direction along a radius of a first disc configured for recording information signals at a first recording density and a second head means moved by a linear motor in a direction along a radius of a second disc configured for recording information signals at a recording density higher than said first recording density, for recording and/or reproducing information signals thereon, interfacing means for sending signals for respectively recording to said first head means and second head means and for respectively receiving signals reproduced by said first head means and second head means, and shock detection means for detecting a shock from outside, said disc driving device controlling recording and/or reproducing processing for said first and second discs on detection of said shock from outside;

a host computer for sending signals for recording to said first and second head means via said interfacing means and for receiving signals reproduced by said first and second head means; and disc drive control means for controlling the recording and/or reproducing operation for said first or second disc, on shock detection by said shock detection means of the disc driving device during the recording and/or reproducing processing for said first or second disc;

wherein said interfacing means includes a first interface for sending signals for recording to said first disc and for sending signals read from said first disc, and a second interface for sending signals for recording to said second disc and for sending signals read from said second disc; and wherein said host computer issuing, via said second interface, a clear command for clearing a shock flag held on detecting the shock by said shock detection means during recording and/or reproducing processing for the first disc, and a command for detecting a possible shock occurrence on reception of end information indicating the end of every pre-set unit of the recording and/or reproducing information signals via the second interfacing means, said host computer causing said disc driving device to execute a re-try on detection of the shock occurrence;

wherein said disc driving control system further includes first recording and/or reproducing signal processing means for performing signal recording processing on signals for recording received from outside via said first interface and for performing signal reproducing processing on signals reproduced by said first head means, and wherein when said first disc is loaded on said disc driving device, and said shock detection means detects the shock, said disc driving device interrupts the recording and/or reproducing processing of said first recording and/or reproducing signal processing means.

* * * * *